(12) United States Patent
Grant

(10) Patent No.: US 9,795,117 B1
(45) Date of Patent: Oct. 24, 2017

(54) PET GARMENT SYSTEMS

(71) Applicant: Margaret Grant, Los Angeles, CA (US)

(72) Inventor: Margaret Grant, Los Angeles, CA (US)

( * ) Notice: Subject to any disclaimer, the term of this patent is extended or adjusted under 35 U.S.C. 154(b) by 42 days.

(21) Appl. No.: 15/089,367

(22) Filed: Apr. 1, 2016

(51) Int. Cl.
*A01K 13/00* (2006.01)
*A01K 27/00* (2006.01)

(52) U.S. Cl.
CPC .......... *A01K 13/006* (2013.01); *A01K 13/007* (2013.01); *A01K 27/001* (2013.01)

(58) Field of Classification Search
CPC .. A01K 13/006; A01K 27/002; A01K 27/006; A01K 27/003; A01K 1/0263; A01K 27/008
USPC ....... 119/850, 792, 863, 702, 856, 858, 907; 54/79.2
See application file for complete search history.

(56) References Cited

U.S. PATENT DOCUMENTS

| | | | | |
|---|---|---|---|---|
| 1,595,834 A * | 8/1926 | Griffiths | ............... | A01K 13/006 119/850 |
| 4,744,333 A * | 5/1988 | Taylor | ................... | A01K 13/007 119/850 |
| 5,408,812 A * | 4/1995 | Stark | ..................... | A01K 13/007 119/850 |
| 5,495,828 A * | 3/1996 | Solomon | ................... | A01L 9/00 119/850 |
| 5,537,954 A * | 7/1996 | Beeghly | ............... | A01K 13/006 119/850 |
| 5,941,199 A * | 8/1999 | Tamura | ................ | A01K 13/006 119/850 |
| 6,123,049 A * | 9/2000 | Slater | ................... | A01K 13/006 119/850 |
| 6,138,611 A | 10/2000 | Thielemann | | |
| 6,443,101 B1 * | 9/2002 | Fazio | .................. | A01K 27/002 119/792 |
| 6,595,162 B1 * | 7/2003 | Hibbert | ............... | A01K 13/006 119/728 |
| 6,694,925 B2 * | 2/2004 | Critzer | ................. | A01K 13/006 119/850 |
| 7,131,399 B2 * | 11/2006 | Blommel | ................ | A61D 3/00 119/712 |
| 7,131,400 B2 | 11/2006 | Wanveer et al. | | |

(Continued)

*Primary Examiner* — Yvonne Abbott-Lewis
(74) *Attorney, Agent, or Firm* — Integrity Patent Group, PLC; Edwin Wold

(57) ABSTRACT

A pet-garment system including a pet-vest-assembly, one or more shoe-assemblies, and a bite-protection-collar. The pet-vest-assembly includes pet-vest and a plurality of vest-straps. The body assembly includes a vest-material, with the vest-material defined by a neck-opening, two front-leg-openings, and a rear-body-opening in functional combination. Preferably, the vest-material is puncture resistant to provide longevity and durability, and additionally water-resistant to provide additional comfort to the pet. The pet-garment system further includes a first-storage-pocket useful for storing one or more shoe-assemblies, a second-storage-pocket useful for storing pet-related accessories, a vaccination-opening useful for allowing the pet to receive vaccinations without a need to remove the pet-vest-assembly, and includes a handle useful for lifting and carrying the pet, in the preferred embodiment.

18 Claims, 5 Drawing Sheets

(56) References Cited

U.S. PATENT DOCUMENTS

| | | | | |
|---|---|---|---|---|
| 7,370,608 B1* | 5/2008 | Friedman | A01K 13/006 119/850 |
| 7,886,698 B2 | 2/2011 | Leonard | |
| 7,918,192 B1* | 4/2011 | Digh | A01K 13/006 119/850 |
| 8,176,880 B2* | 5/2012 | Hurwitz | A01K 13/007 119/850 |
| 8,210,131 B2* | 7/2012 | Friedland | A01K 13/006 119/792 |
| 8,733,296 B1* | 5/2014 | Douglas | A01K 13/006 119/850 |
| 8,807,090 B1* | 8/2014 | Potts | A01K 23/00 119/850 |
| D744,703 S * | 12/2015 | Kok-Duson | D30/144 |
| 9,332,734 B1* | 5/2016 | Hege | A01K 27/002 |
| 2005/0217609 A1* | 10/2005 | Dorton | A01K 13/006 119/792 |
| 2007/0204808 A1* | 9/2007 | Harada | A01K 13/006 119/850 |
| 2008/0276880 A1* | 11/2008 | Swisher | A01K 27/002 119/728 |
| 2009/0292343 A1* | 11/2009 | Sternlight | A01K 13/006 607/112 |
| 2010/0043725 A1* | 2/2010 | Hall | A01K 13/006 119/850 |
| 2010/0116221 A1* | 5/2010 | Falcon-Labry | A01K 27/003 119/792 |
| 2010/0199507 A1* | 8/2010 | Gonzalez | A01K 13/006 33/511 |
| 2010/0199927 A1* | 8/2010 | Cigard | A01K 1/0263 119/850 |
| 2010/0319632 A1* | 12/2010 | Blizzard | A01K 13/006 119/850 |
| 2012/0024239 A1* | 2/2012 | Forbes | A01K 13/006 119/850 |
| 2013/0014705 A1* | 1/2013 | Cho | A01K 27/006 119/850 |
| 2013/0186348 A1* | 7/2013 | Blizzard | A61D 9/00 119/850 |
| 2013/0276717 A1* | 10/2013 | Fuller | A01K 27/004 119/794 |
| 2013/0333628 A1* | 12/2013 | Wickens | A01K 15/02 119/702 |
| 2014/0041599 A1* | 2/2014 | Sebo | A01K 13/006 119/850 |
| 2014/0069351 A1* | 3/2014 | Stratton | A01K 13/006 119/850 |
| 2014/0174379 A1* | 6/2014 | Kissel, Jr. | A01K 27/002 119/850 |
| 2014/0174381 A1* | 6/2014 | Cozzolino | A01K 13/006 119/863 |
| 2014/0318478 A1* | 10/2014 | Cruz | A01K 13/006 119/850 |
| 2015/0020755 A1* | 1/2015 | Chortyk-White | A01K 27/002 119/850 |
| 2015/0090195 A1* | 4/2015 | Krupich | A01K 27/002 119/792 |
| 2015/0245591 A1* | 9/2015 | Dumas, Jr. | A01K 27/002 119/851 |
| 2015/0334991 A1* | 11/2015 | Foley | A01K 27/009 119/720 |
| 2016/0044895 A1* | 2/2016 | Schnieder | A01K 13/007 119/850 |
| 2017/0006827 A1* | 1/2017 | Miller | A01K 13/006 |
| 2017/0099807 A1* | 4/2017 | Northrop | A01K 13/006 |
| 2017/0156290 A1* | 6/2017 | Speed | A01K 13/006 |

* cited by examiner

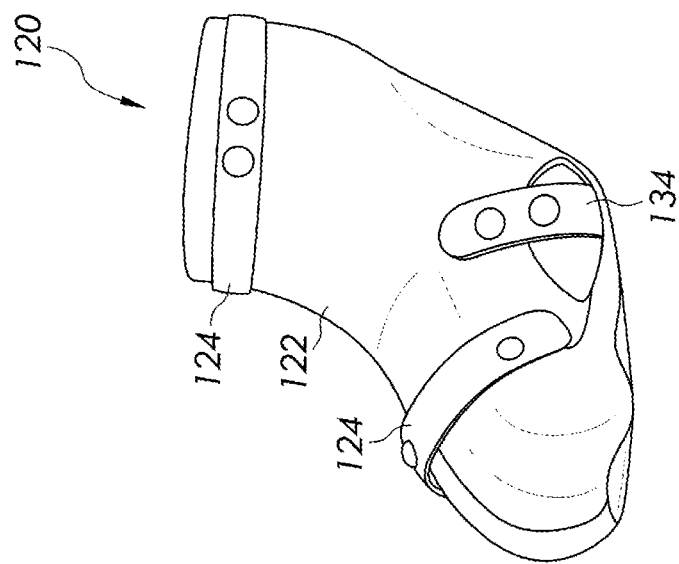
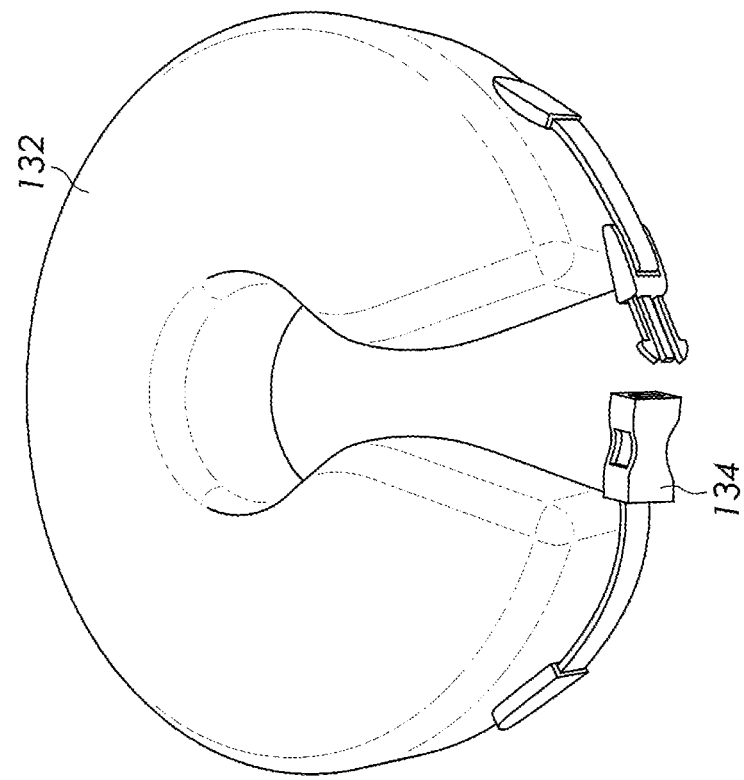
FIG. 4A
FIG. 4B

PET GARMENT SYSTEMS

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of pet accessories and more specifically relates to pet-garment systems.

2. DESCRIPTION OF RELATED ART

A pet is generally an animal kept for an individual's or family's company, and companionship. Sometimes pets may be therapeutic to their hosts. Pets commonly provide their companions/owners both physical and emotional benefits; for example, walking a dog (or other pet) may supply both the human and pet with exercise, fresh air, and social interaction. In the United States there are almost 80 million pet dogs approximately 86 million pet cats, which have traditionally been the most popular pets.

However, having an animal as a pet requires certain effort and upkeep. Keeping animals as pets may be detrimental to the health and of the pet and dangerous to the owner/companion if certain maintenance is not properly kept current. For most pets, visits to a veterinarian are common to maintain the health and well being of the pet and, generally veterinary visits include vaccinations. In some case, the pet may become agitated and/or aggressive during such vaccinations causing injury to the pet, the veterinary technician, and/or the owner/companion. Additionally, pet grooming may be employed to maintain the pet's coat, claws, teeth, ears, and anus gland, which may further add risk of injury to the pet, owner/companion, and grooming staff. Therefore a suitable solution is desired.

Several attempts have been made to solve the above-mentioned problems such as those found in U.S. Pat. and Pub. Nos. 2014/0174381 to Cozzolino et al.; U.S. Pat. No. 7,131,400 to Wanveer et al.; U.S. Pat. No. 6,694,925 to Critzer; U.S. Pat. No. 7,370,608 to Freidman; U.S. Pat. No. 7,886,698 to Leonard; and U.S. Pat. No. 6,138,611 to Thielmann. This art is representative of pet accessories. However, none of the above inventions and patents, taken either singly or in combination, is seen to describe the invention as claimed.

Preferably, a pet-garment system should provide an easy to use device useful for comforting and safely restraining a pet during times of potential stress for the pet and, yet would operate reliably and be manufactured at a modest expense. Thus, a need exists for a reliable pet-garment system to avoid the above-mentioned problems.

BRIEF SUMMARY OF THE INVENTION

In view of the foregoing disadvantages inherent in the known pet accessories art, the present invention provides a novel pet-garment system. The general purpose of the present invention, which will be described subsequently in greater detail is to provide a device useful for providing comfort, security and safety to a pet during times of potential stress; such as veterinary visits or grooming, in order to reduce the chances of the pet, caretaker, or veterinary/grooming staff being hurt or injured.

A pet-garment system is disclosed herein, entitled 'Snugible', in a preferred embodiment, comprising a pet-vest-assembly, one or more shoe-assemblies, and a bite-protection-collar. In the preferred embodiment the pet-vest-assembly comprises pet-vest and a plurality of vest-straps. The body assembly is comprised of a vest-material, with the vest-material is defined by a neck-opening, two front-leg-openings, and a rear-body-opening in functional combination. Preferably, the vest-material is puncture resistant to provide longevity and durability, and is additionally water-resistant to provide additional comfort to the pet. The preferred embodiment of the pet-garment system in intended for use on/with a canine or feline pet.

The pet-garment system, SNUGIBLE™, further comprises a first-storage-pocket useful for storing one or more shoe-assemblies, a second-storage-pocket useful for storing pet-related accessories, a vaccination-opening useful for allowing the pet to receive vaccinations or subcutaneous fluids without a need to remove the pet-vest-assembly, and includes a handle useful for lifting and carrying the pet; in the preferred embodiment.

In the preferred embodiment the one or more shoe-assemblies comprise a foot-cover and a plurality of foot-cover-straps; where the one or more shoe-assemblies are useful for protecting one or more feet of the pet. The bite-protection collar is affixable to the pet-vest-assembly and the bite-protection collar includes a removable-memory-foam core to provide comfort and safety to the pet during use. The bite-protection-collar is useful for preventing the pet from biting a groomer, a veterinarian or an owner/companion by restraining the head and/or neck of the pet. The bite-protection-collar further protects injuries and areas where the pet had surgery from any chewing, biting or loosening stitches by the pet. The comfortable yet substantial bite-protection-collar may be used in lieu of the cumbersome 'Elizabethan' collar commonly used. The 'Elizabethan' collar does not allow the pet to drink comfortably and hinders the sight of the pet, therefore sometimes, causing the pet to bump into furniture, etc. In addition, the bite-protection-collar protects the vulnerable neck of the pet from potential animal bites. There are snaps for the rear of the vest that fold the material back for male dogs, so male dogs can still be walked wearing The Snugible and they will not urinate on it.

The pet-vest-assembly is structured and arranged to provide a user with a device useful for calming, restraining, and/or carrying a pet such that the pet may receive grooming or medical attention with a reduced chance of injury to the pet and/or the user and includes a plurality of straps and clips to secure the pet-vest-assembly to the pet.

Also disclosed, in a preferred embodiment, is a method of using a pet-garment system; the steps of which preferably comprise: providing a pet-garment system (including a pet-vest-assembly, one or more shoe-assemblies, and a bite-protection collar), placing the pet-vest-assembly upon the pet, affixing the plurality of vest-straps to secure the pet-vest-assembly upon the pet, placing the one or more shoe-assemblies upon one or more feet of the pet, and placing the bite-protection collar upon the pet. Additional steps of the preferred method include removing the bite-protection collar from the pet, removing the one or more shoe-assemblies from one or more feet of the pet, removing the plurality of vest-straps from the pet-vest-assembly, and removing the pet-vest-assembly from the pet.

The present invention holds significant improvements and serves as a complete pet-garment system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, pet-garment systems, constructed and operative according to the teachings of the present invention.

FIG. 4A is a perspective view illustrating the bite-protection-collar of the pet-garment system according to an embodiment of the present invention of FIGS. 1-3.

FIG. 4B is a perspective view illustrating shoe-assembly of the pet-garment system according to an embodiment of the present invention of FIGS. 1-3.

The various embodiments of the present invention will hereinafter be described in conjunction with the appended drawings, wherein like designations denote like elements.

DETAILED DESCRIPTION

Figure 1:
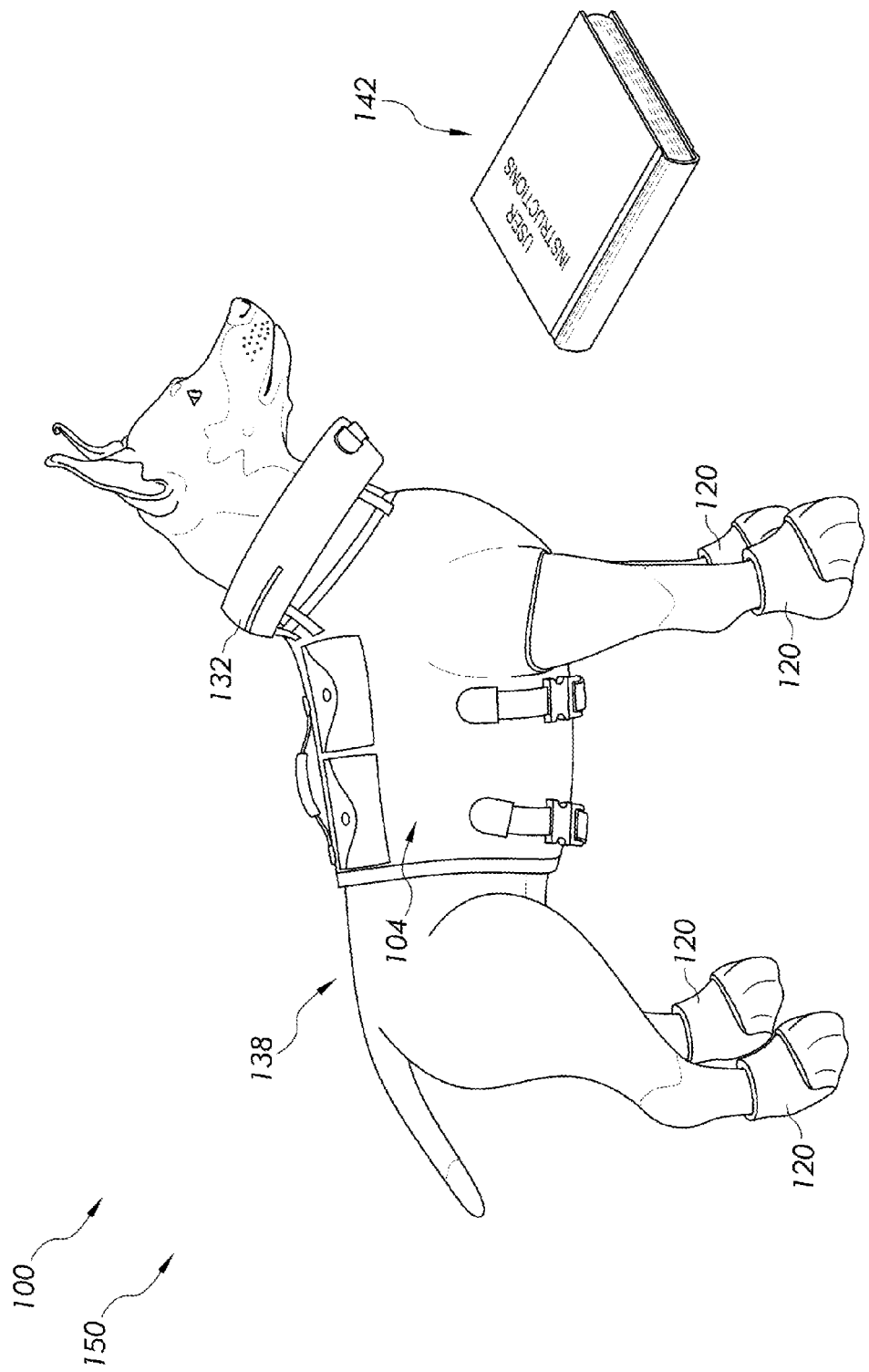
FIG. 1 shows a perspective view illustrating a pet-garment system during an 'in-use' condition showing a pet wearing a pet-vest-assembly, a bite-protection-collar, and a plurality of shoe-assemblies according to an embodiment of the present invention.
Figure 2:
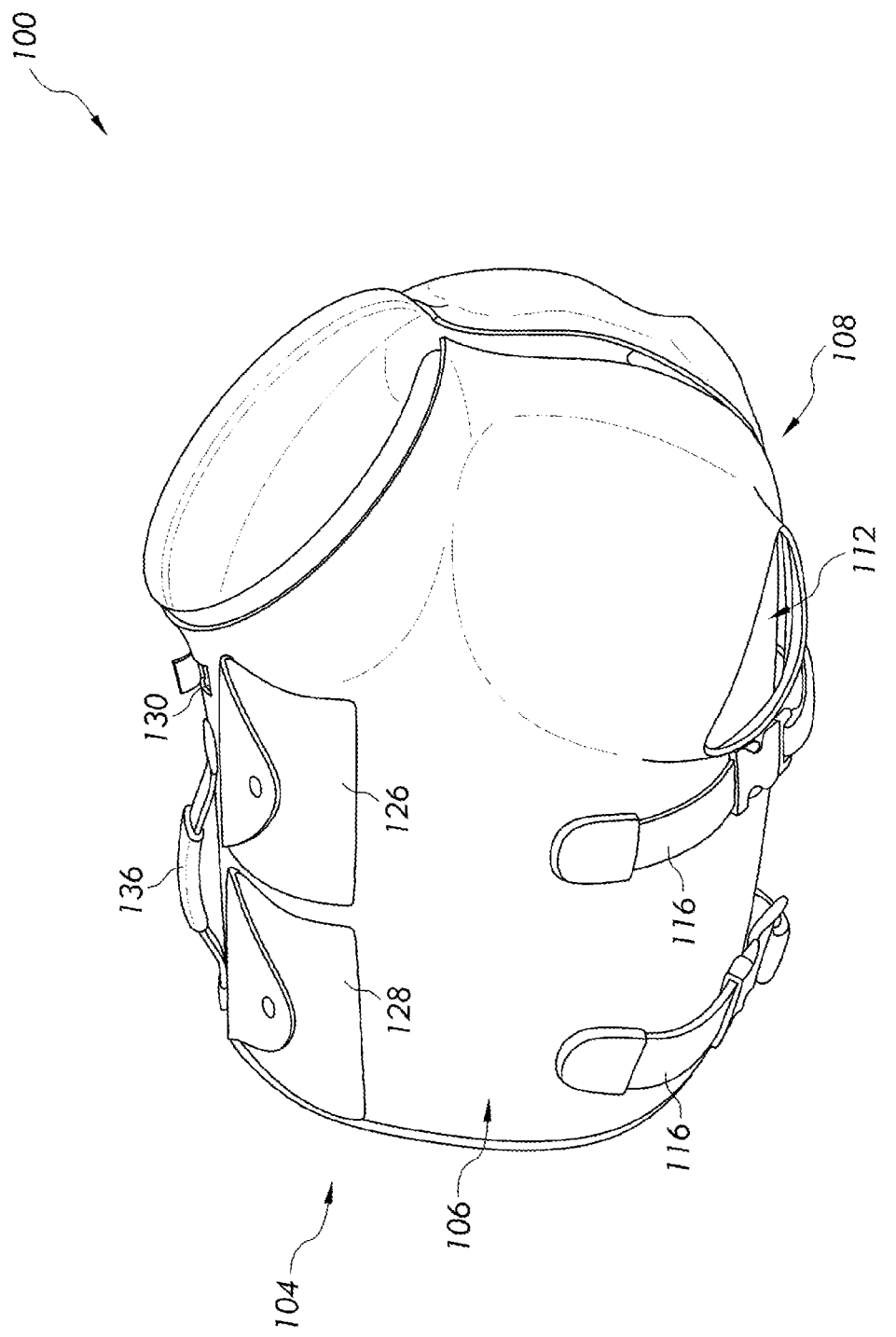
FIG. 2 is a perspective view illustrating the pet-garment system comprising a pet-vest-assembly according to an embodiment of the present invention of FIG. 1.
Figure 3:
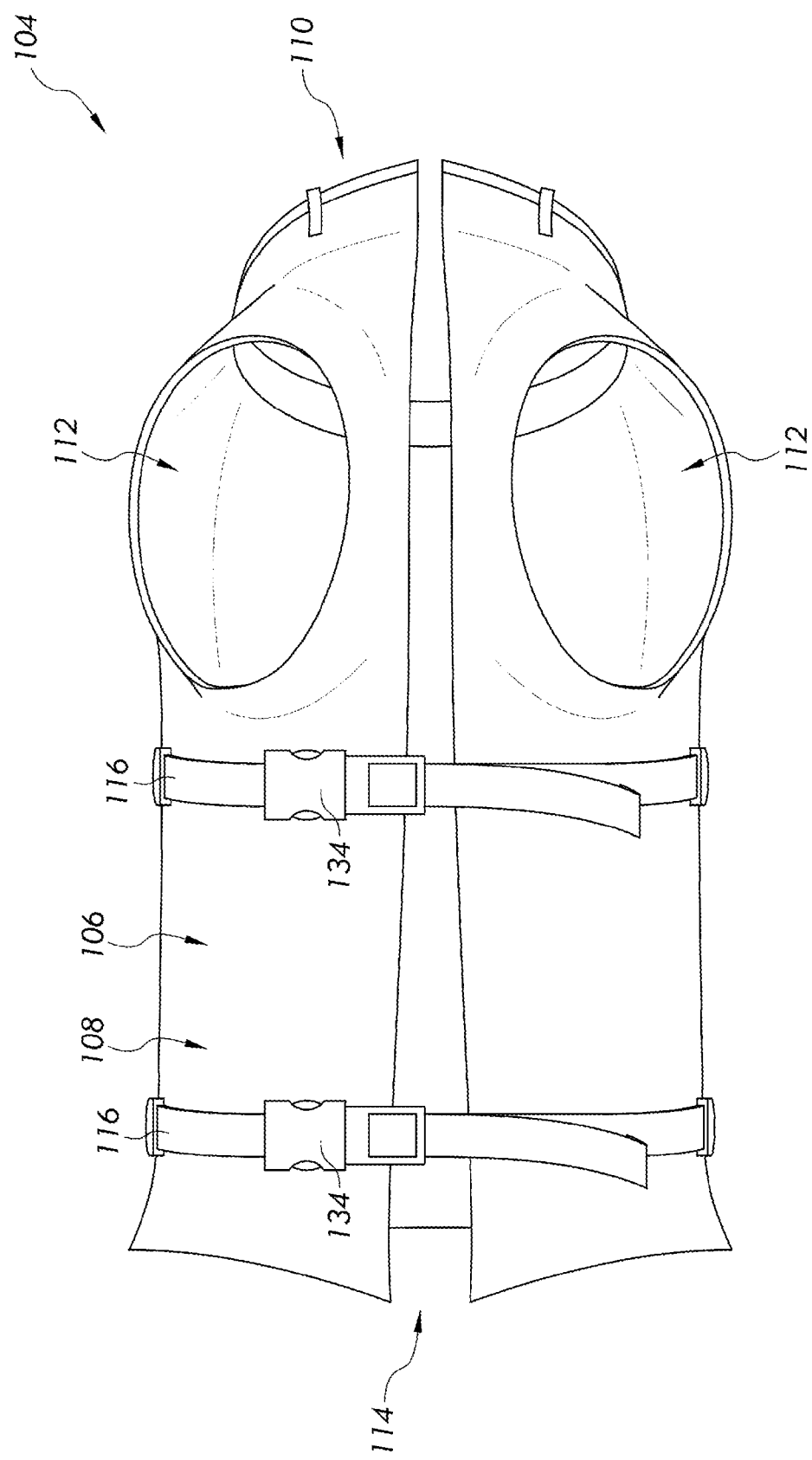
FIG. 3 is a perspective view illustrating a pet-vest-assembly according to an embodiment of the present invention of FIGS. 1-2.

As discussed above, embodiments of the present invention relate to a pet accessory and more particularly to a complete pet-garment system as used to improve the safety of the pet, the user/owner, groomers, and veterinary staff and improve the comfort of the pet during times of duress or medical examination.

Generally speaking, a pet-garment system (SNU-GIBLE™) may comprise a pet-vest-assembly, one or more shoe-assemblies, and a bite-protection-collar. Pet-garment system may be structured and arranged to provide user with device useful for calming and/or restraining pet such that pet may receive grooming or medical attention with a reduced chance of injury to pet and/or other persons.

Referring to the drawings by numerals of reference there is shown in FIGS. 1-4B, pet-garment system 100 comprises pet-vest-assembly 104. Some embodiments of pet-garment system 100 may further comprise one or more shoe-assemblies 120 and bite-protection-collar 132. Pet-garment system 100 may also comprise first-storage-pocket 126 useful for storing one or more shoe-assemblies 120, and may further include second-storage-pocket 128 useful for storing other pet-related accessories.

Bite-protection-collar 132, in embodiments, may useful for preventing pet 138 from biting a groomer, a veterinarian or an owner or biting/chewing a surgical scar by restraining a head and neck of pet 138, and bite-protection collar 132 may be affixable to pet-vest-assembly 104. Additionally, bite-protection collar 132 may include a removable-memory-foam core to provide comfort and safety to pet 138.

Pet-vest-assembly 104 may comprise pet-vest 106; pet-vest 106 may comprise vest-material 108. In distinct embodiments, vest-material 108 may be defined by neck-opening 110, two front-leg-openings 112, rear-body-opening 114; and a plurality of vest-straps 116, in functional combination. Pet-vest-assembly 104 may be structured and arranged to provide a user (e.g., owner, companion, veterinary staff, grooming staff, etc.) with a device useful for calming and/or restraining pet 138 such that pet 138 may receive grooming or medical attention with a reduced chance of injury to pet 138 and/or user (person or persons in a vicinity).

Shoe-assembly 120 may comprise foot-cover 122; and plurality of foot-cover-straps 124; wherein one or more shoe-assemblies 120 are useful for protecting one or more feet of pet 138. Certain embodiments of pet-garment system 100 may include pet-vest-assembly 104 which further comprises vaccination-opening 130 useful for allowing pet 138 to receive vaccinations and/or subcutaneous fluids without a need to remove pet-vest-assembly 104.

Some embodiments of pet-garment system 100 may include plurality of vest-straps 116 which include a plurality of clips 134 to secure pet-vest-assembly 104 to pet 138, or vest-straps 116; may include a plurality of buttons or include a hook-and-loop fabric for securing pet-vest-assembly 104 to pet 138.

Some embodiments of pet-garment system 100 may include pet-vest-assembly 104 further including handle 136 useful for lifting and carrying pet 138. Further, pet-garment system 100 may include vest-material 108 which is puncture resistant to provide longevity and durability and/or include vest-material 108 which is water-resistant to provide additional comfort to pet 138.

Some embodiments of pet-garment system 100 may be used on pet 138 which is a canine, or, alternately, pet may be a feline. Pet-garment system 100 may be adaptable to other species, pets or animals, depending upon user/owner/companion preferences.

It should be noted that pet-garment system 100 may be sold as a kit comprising the following parts: at least one pet-garment system 100 (including pet-vest assembly 104, one or more shoe-assemblies 120, and bite-protection collar 132); and at least one set of user instructions 142. The kit has instructions such that functional relationships are detailed in relation to the structure of the invention (such that the invention can be used, maintained, or the like in a preferred manner). Pet-garment system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different coupling combinations, parts may be sold separately, etc., may be sufficient.

Figure 5:
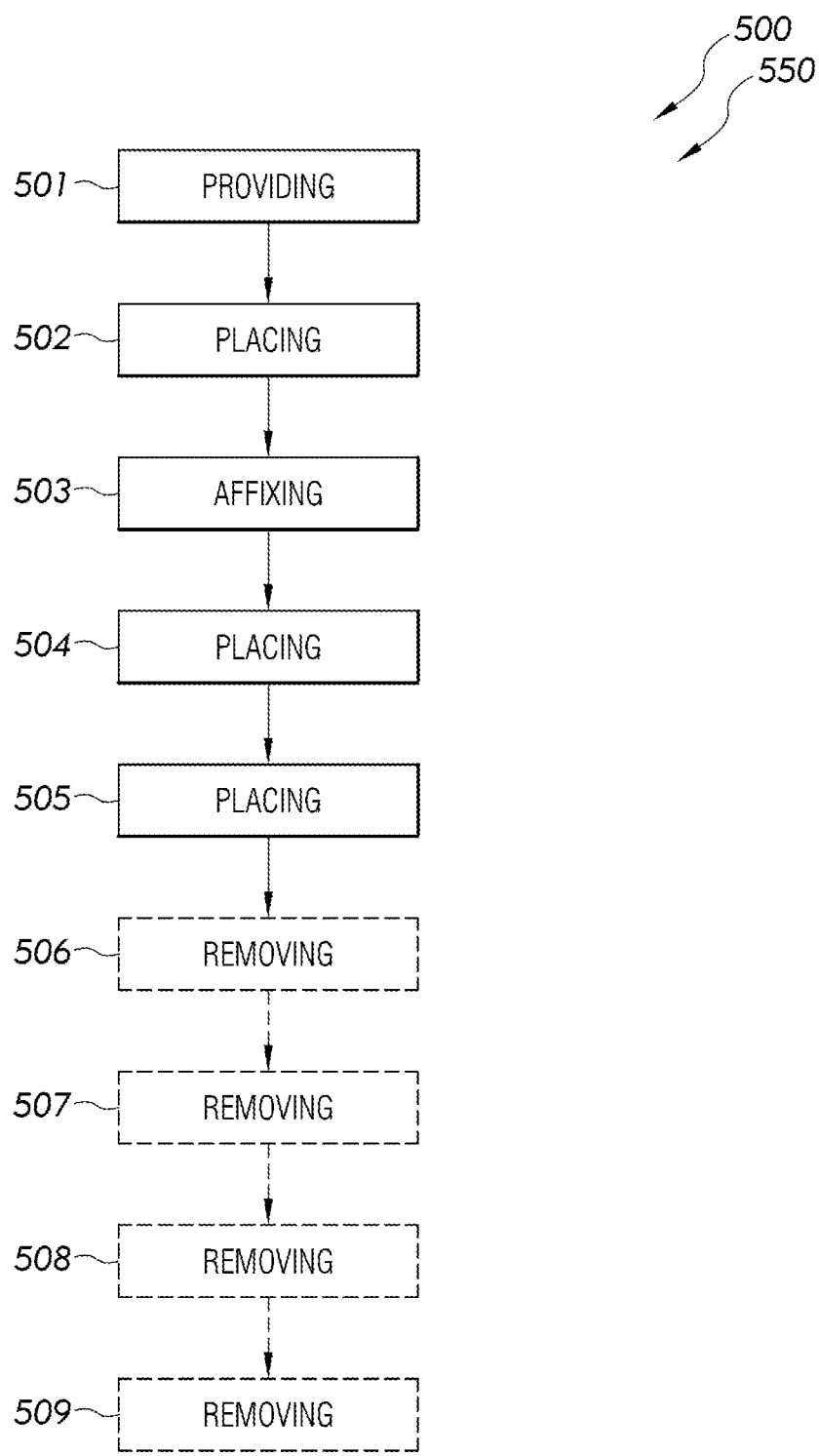
FIG. 5 is a flowchart illustrating a method of use for a pet-garment system according to an embodiment of the present invention of FIGS. 1-4B.

Referring now to FIG. 5 showing flowchart 550 illustrating method of use 500 for pet-garment system 100 according to an embodiment of the present invention of FIGS. 1-4B.

As shown, method of use 500 may comprise the steps of: step one 501, providing pet-garment system 100; step two 502, placing pet-garment system 100 upon pet 138; step three 503, affixing plurality of vest-straps 116 to secure pet-vest assembly 104 upon pet 138; step four 504, placing one or more shoe-assemblies 120 upon one or more feet of pet 138; step five 505, placing bite-protection-collar 132 upon pet 138; step six 506; removing bite-protection-collar 132 from pet 138; step seven 507, removing one or more shoe-assemblies 120 from one or more feet of pet 138; step eight 508, removing plurality of vest-straps 116 from pet-vest assembly 104; and step nine 509, removing pet-vest-assembly 104 from pet 138.

It should be noted that step six 506, step seven 507, step eight 508, and step nine 509 are optional steps and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pet-garment system comprising:
   a) a pet-vest-assembly comprising;
      i) a pet-vest comprising;
         a vest-material comprising;
            a neck-opening;
            two front-leg-openings; and
            a rear-body-opening; and
      ii) a plurality of vest-straps;
   b) wherein said pet-garment system comprises said pet-vest-assembly;
   c) wherein said pet-vest comprises said body-assembly;
   d) wherein said body-assembly comprises said vest-material;
   e) wherein said vest-material is defined by said neck-opening, said two-front-leg-openings, and said rear-body-opening in functional combination;
   f) wherein said pet-vest-assembly is structured and arranged to provide a user with a device useful for calming and/or restraining a pet such that said pet may receive grooming or medical attention with a reduced chance of injury to said pet and/or said user;
   g) wherein said bite-protection collar is affixable to said pet-vest-assembly; and
   h) wherein said bite-protection collar includes a removable-memory-foam core to provide comfort and safety to said pet.

2. The pet-garment system of claim 1 further comprising one or more shoe-assemblies, said one or more shoe-assemblies each comprising;
   a) a foot-cover; and
   b) a plurality of foot-cover-straps; and
   c) wherein said one or more shoe-assemblies are useful for protecting one or more feet of said pet.

3. The pet-garment system of claim 2 further comprising a first-storage-pocket useful for storing one or more said shoe-assemblies.

4. The pet-garment system of claim 1 further comprising a second-storage-pocket useful for storing pet-related accessories.

5. The pet-garment system of claim 1 wherein said pet-vest-assembly further comprises a vaccination-opening useful for allowing said pet to receive vaccinations and subcutaneous fluids without a need to remove said pet-vest-assembly.

6. The pet-garment system of claim 1 further comprising a bite-protection-collar and said bite-protection-collar useful for preventing said pet from biting a groomer, a veterinarian and alternately an owner by restraining a head and neck of said pet.

7. The pet-garment system of claim 1 wherein said plurality of vest-straps includes a plurality of clips to secure said pet-vest-assembly to said pet.

8. The pet-garment system of claim 1 wherein said plurality of vest-straps includes a plurality of buttons to secure said pet-vest-assembly to said pet.

9. The pet-garment system of claim 1 wherein said plurality of vest-straps includes a hook-and-loop fabric to secure said pet-vest-assembly to said pet.

10. The pet-garment system of claim 1 wherein said pet-vest-assembly further includes a handle useful for lifting and carrying said pet.

11. The pet-garment system of claim 1 wherein said vest-material is puncture resistant to provide longevity and durability.

12. The pet-garment system of claim 1 wherein said vest-material is water-resistant to provide additional comfort to said pet.

13. The pet-garment system of claim 1 wherein said pet is a canine.

14. The pet-garment system of claim 1 wherein said pet is a feline.

15. A pet-garment system comprising:
   a) a pet-vest-assembly comprising;
      i) a pet-vest comprising;
         a vest-material comprising;
            a neck-opening;
            two front-leg-openings; and
            a rear-body-opening; and
      ii) a plurality of vest-straps;

b) one or more shoe-assemblies, said one or more shoe-assemblies comprising;
   i) a foot-cover; and
   ii) a plurality of foot-cover-straps;
   iii) wherein said one or more shoe-assemblies are useful for protecting one or more feet of said pet;
c) wherein said pet-garment system comprises said pet-vest-assembly;
d) wherein said pet-vest-assembly comprises said pet-vest;
e) wherein said pet-vest comprises said vest-material;
f) wherein said vest-material is defined by said neck-opening, said two-front-leg-openings, and said rear-body-opening in functional combination;
g) wherein said one or more shoe-assemblies comprises said foot-cover, and said plurality of foot-cover-straps;
h) wherein said pet-vest-assembly is structured and arranged to provide a user with a device useful for calming and/or restraining a pet such that said pet may receive grooming or medical attention with a reduced chance of injury to said pet and/or said user;
i) wherein said pet-garment system further comprise a first-storage-pocket useful for storing one or more said shoe-assemblies;
j) wherein said pet-garment system further comprises a second-storage-pocket useful for storing pet-related accessories;
k) wherein said pet-vest assembly further comprises a vaccination-opening useful for allowing said pet to receive vaccinations and subcutaneous fluids without a need to remove said pet-vest-assembly;
l) wherein said pet-garment system comprises a bite-protection-collar, said bite-protection-collar useful for preventing said pet from biting a groomer, a veterinarian or an owner by restraining a head and neck of said pet;
m) wherein said bite-protection collar is affixable to said pet-vest-assembly;
   i) wherein said bite-protection collar includes a removable-memory-foam core to provide comfort and safety to said pet;
n) wherein said plurality of vest-straps includes a plurality of clips to secure said pet-vest-assembly to said pet;
o) wherein said pet-vest-assembly further includes a handle useful for lifting and carrying said pet;
p) wherein said vest-material is puncture resistant to provide longevity and durability;
q) wherein said vest-material is water-resistant to provide additional comfort to said pet; and
r) wherein said pet is a canine.

16. The pet-garment system of claim 15 further comprising a kit including:
   i) said pet-garment including;
      (1) said pet-vest assembly;
      (2) one or more said shoe-assemblies; and
      (3) said bite-protection collar; and
   i) a set of user instructions.

17. A method of using a pet-garment system comprising the steps of:
   i) providing a pet-garment including a pet-vest assembly, one or more shoe-assemblies, and a bite-protection collar;
   ii) placing said pet-garment upon a pet;
   iii) affixing a plurality of vest-straps to secure said pet-vest assembly upon said pet;
   iv) placing said one or more shoe-assemblies upon one or more feet of said pet; and
   v) placing said bite-protection collar upon said pet.

18. The method of claim 17 further comprising the steps of:
   i) removing said bite-protection collar from said pet;
   ii) removing said one or more shoe-assemblies from one or more feet of said pet;
   iii) removing said plurality of vest-straps from said pet-vest assembly; and
   iv) removing said pet-vest assembly from said pet.

\* \* \* \* \*